United States Patent
Nishidate

(10) Patent No.: US 10,340,773 B2
(45) Date of Patent: Jul. 2, 2019

(54) BRUSHLESS MOTOR HAVING AN OUTER ROTOR AND AN ANNULAR SEPARATION PLATE BETWEEN THE DRIVE MAGNET AND THE POSITION DETECTION MAGNET

(71) Applicant: Tokyo Parts Industrial Co., Ltd., Gunma-ken (JP)

(72) Inventor: Masahiro Nishidate, Gunma-ken (JP)

(73) Assignee: Tokyo Parts Industrial Co., Ltd. (JP)

( * ) Notice: Subject to any disclaimer, the term of this patent is extended or adjusted under 35 U.S.C. 154(b) by 115 days.

(21) Appl. No.: 15/796,939

(22) Filed: Oct. 30, 2017

(65) Prior Publication Data

US 2018/0205295 A1 Jul. 19, 2018

(30) Foreign Application Priority Data

Jan. 17, 2017 (JP) .................................. 2017-005726

(51) Int. Cl.
| | |
|---|---|
| *H02K 1/12* | (2006.01) |
| *H02K 11/21* | (2016.01) |
| *H02K 21/22* | (2006.01) |
| *H02K 29/08* | (2006.01) |
| *H02K 11/215* | (2016.01) |

(52) U.S. Cl.
CPC .............. *H02K 11/21* (2016.01); *H02K 1/12* (2013.01); *H02K 11/215* (2016.01); *H02K 21/22* (2013.01); *H02K 29/08* (2013.01)

(58) Field of Classification Search
CPC ........ H02K 11/21; H02K 21/22; H02K 29/08; H02K 11/215; H02K 1/12
USPC ............................................ 310/68 B, 156.05
See application file for complete search history.

(56) References Cited

U.S. PATENT DOCUMENTS

| | | | | |
|---|---|---|---|---|
| 5,006,943 A * | 4/1991 | Elsasser | ............... | G11B 17/038 310/156.05 |
| 5,408,153 A * | 4/1995 | Imai | ........................ | G11B 19/20 310/156.05 |
| 5,610,457 A * | 3/1997 | Kurita | .................... | H02K 29/08 310/156.05 |
| 5,744,894 A * | 4/1998 | Cho | ........................ | H02K 29/08 310/156.05 |
| 5,783,880 A * | 7/1998 | Teshima | ............. | G11B 19/2009 310/156.13 |
| 5,796,200 A * | 8/1998 | Sakashita | ............. | H02K 1/2786 29/596 |
| 6,320,288 B1 * | 11/2001 | Suzuki | .................... | H02K 29/08 310/67 R |
| 6,657,328 B2 * | 12/2003 | Shiga | .................... | H02K 1/2786 310/156.05 |

(Continued)

FOREIGN PATENT DOCUMENTS

| | | |
|---|---|---|
| JP | 1993191939 A | 7/1993 |
| JP | 2006314165 A | 11/2006 |

*Primary Examiner* — John K Kim
(74) *Attorney, Agent, or Firm* — Jordan and Koda, PLLC

(57) ABSTRACT

In a brushless motor having a rotor in which a drive magnet 43 and a position detection magnet 44 are fixed to the inside of a rotor case 44, along the axial direction, an annular separation plate 45 having positioning parts 45a and 45b for positioning these in the circumferential direction is disposed between the drive magnet 43 and the position detection magnet 44. Thereby, the magnetic influence of the drive magnet can be limited, and thus a highly reliable position detection signal can be obtained.

16 Claims, 4 Drawing Sheets

(56) References Cited

U.S. PATENT DOCUMENTS

| | | | |
|---|---|---|---|
| 7,242,121 B2* | 7/2007 | Kadowaki | H02K 29/14 310/156.05 |
| 2001/0019230 A1* | 9/2001 | Furuki | H02K 29/14 310/68 B |
| 2018/0205295 A1* | 7/2018 | Nishidate | H02K 1/12 |

* cited by examiner

BRUSHLESS MOTOR HAVING AN OUTER ROTOR AND AN ANNULAR SEPARATION PLATE BETWEEN THE DRIVE MAGNET AND THE POSITION DETECTION MAGNET

BACKGROUND

1. Technical Field

The present invention relates to a brushless motor having a position detection mechanism.

2. Related Art

Brushless motors of the so-called outer rotor type, which have an outer rotor, are used as spindle motors for rotationally driving color wheels in projector devices, polygon mirrors in printer devices and the like. Brushless motors of this sort are known in which with a magnet is provided for detecting the speed of the rotor, or a mechanism is provided that outputs an index signal having one pulse for each revolution of the rotor so as to detect the rotational position of the rotor.

For example, Japanese Patent Laid-Open Publication No. 2006-314165 describes a motor in which the drive magnet protrudes beyond the bottom face of a rotor holder and a position detection magnet is mounted on the outer circumferential face of the protrusion concentric with the rotor holder.

With the motor described in Japanese Patent Laid-Open Publication No. 2006-314165, by separating the drive magnet and the position detection magnet, the position detection magnet is less readily subject to the magnetic influence of the drive magnet, whereby it is said that reading precision can be improved in rotor position detection.

Furthermore, Japanese Patent Laid-Open Publication No. H05-191939 describes a brushless motor having: a first magnet, which has a first magnetization pattern for generating torque; and a second magnet formed separately from the first magnet, which has a second magnetization pattern that is different from the first magnet magnetization pattern, and is detected by a position sensor. Furthermore, in this brushless motor, a mechanical positioning means is formed on the engaging faces of the first magnet and the second magnet.

With the brushless motor described in Japanese Patent Laid-Open Publication No. H05-191939, because the first magnetization pattern formed in the first magnet and the second magnetization pattern formed on the second magnet have little magnetic influence on each other and the polarities of the first magnet and the second magnet can be matched, it is said that the rotational speed of the rotor or the position thereof can be accurately found.

However, in the motors described in Japanese Patent Laid-Open Publication No. 2006-314165 and Japanese Patent Laid-Open Publication No. H05-191939, there is a problem that, because the position detection magnets are directly fixed to the drive magnets, the position detection magnet is subjected to considerable magnetic influence by the drive magnet, and thus the reading precision in position detection is inferior.

SUMMARY

One or more exemplary mode of embodiment of the present invention provides a brushless motor capable of substantially limiting the magnetic influence of a drive magnet and obtaining a highly reliable position detection signal.

Note that, in the aspects described below, the constituent elements employed can be used in the most freely chosen combinations possible. Furthermore, the aspects and technical features of the present invention are not limited to those described hereafter, and are to be understood based on the description in the entire specification and the drawings, or based on the inventive ideas that can be grasped by the skilled artisan based on these descriptions.

In a first aspect of the invention relating to a brushless motor having an outer rotor, the rotor has a rotary shaft, a rotor case fixed to the rotary shaft, and a cylindrical drive magnet and a cylindrical position detection magnet fixed to the inside of the rotor case, along the axial direction, the drive magnet and the position detection magnet are alternately magnetized to N poles and S poles, in the circumferential direction, an annular separation plate is disposed between the drive magnet and the position detection magnet, and the separation plate has a positioning part for positioning the drive magnet and the position detection magnet in the circumferential direction.

In a second aspect of the present invention relating to a brushless motor having an outer rotor, the rotor has a rotary shaft, a rotor case fixed to the rotary shaft, and a cylindrical drive magnet and a cylindrical position detection magnet fixed to the inside of the rotor case, along the axial direction, the drive magnet and the position detection magnet are alternately magnetized to N poles and S poles, in the circumferential direction, an annular separation plate is disposed between the drive magnet and the position detection magnet, the separation plate has a positioning part for positioning the drive magnet and the position detection magnet in the circumferential direction, a plurality of the positioning parts are arranged at equal intervals in the circumferential direction, and the drive magnet and the position detection magnet are positioned so that, in at least one location, boundary regions between N poles and S poles are at the same position in the circumferential direction.

DETAILED DESCRIPTION OF THE PREFERRED EMBODIMENTS

Figure 1:
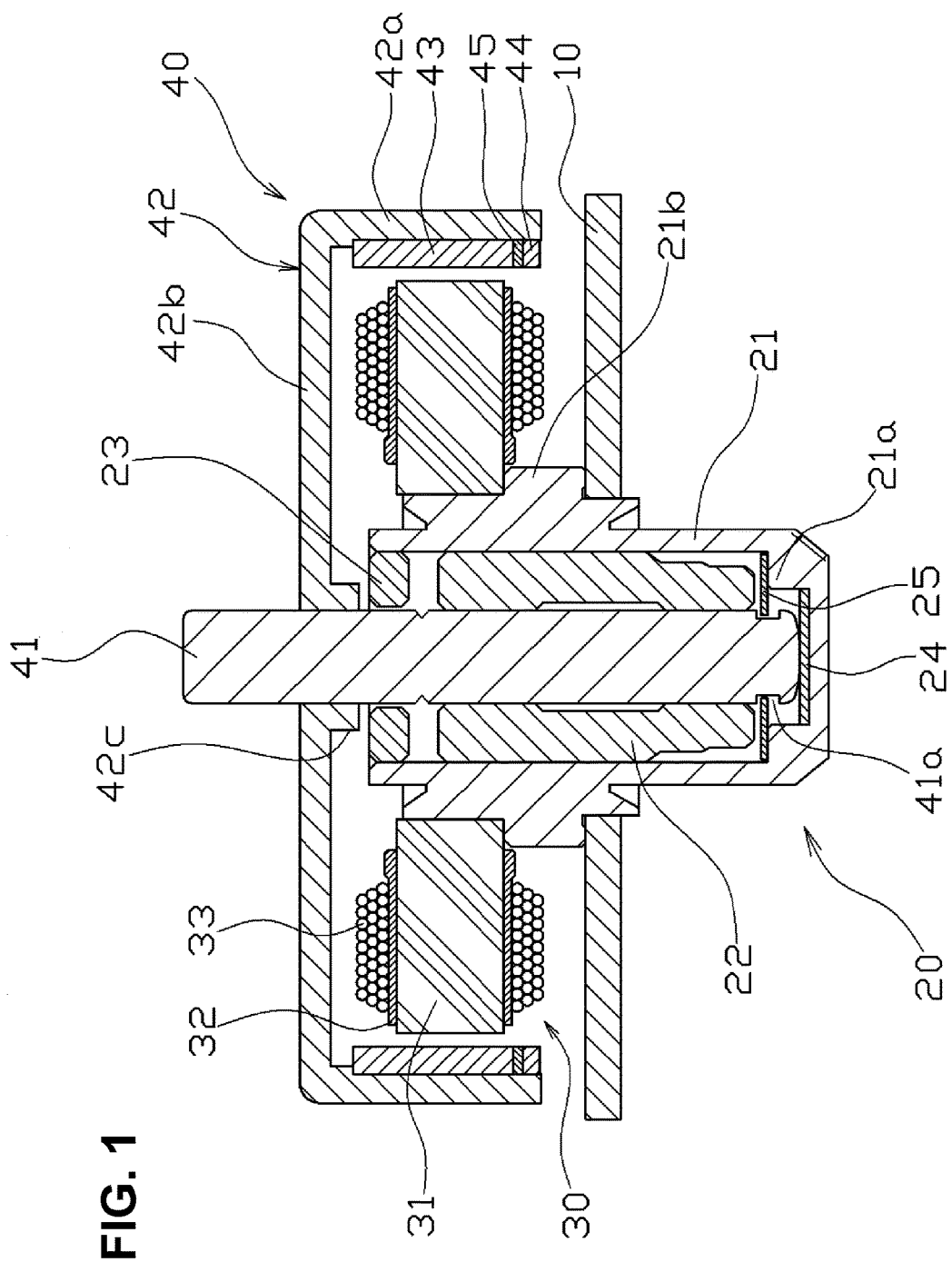
FIG. 1 is a sectional view of a brushless motor according to a first exemplary mode of embodiment of the present invention.

In the present specification, the direction parallel to the rotary shaft 41 in FIG. 1 is referred to as the "axial direction," the radial direction centered on the rotary shaft 41 is referred to as the "radial direction", and the circumferential direction centered on the rotary shaft 41 is defined is referred to as the "circumferential direction."

First Exemplary Mode of Embodiment

Figure 2:
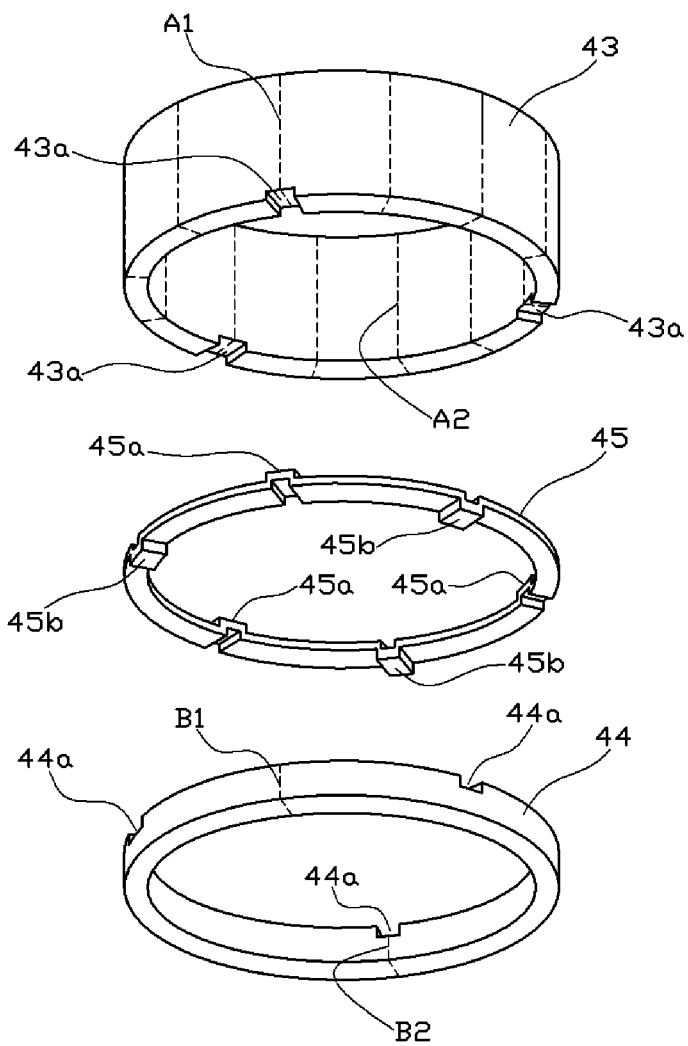
FIG. 2 is a perspective view of the drive magnet, the separation plate and the position detection magnet in the brushless motor of FIG. 1.
Figure 3:
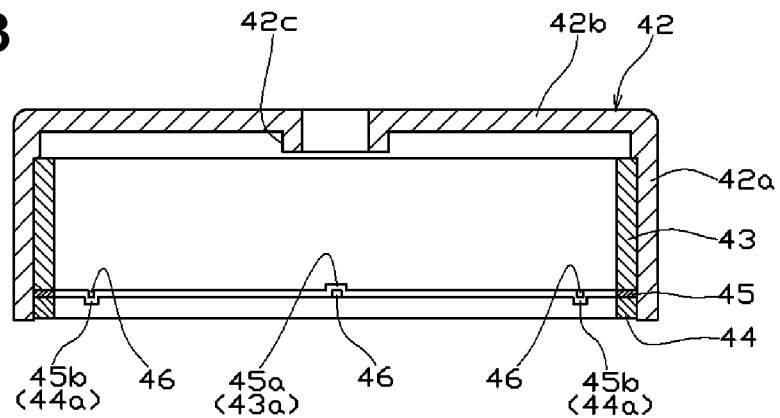
FIG. 3 is a sectional view showing the state in which the drive magnet, the separation plate and the position detection magnet are assembled in the rotor case, in the brushless motor of FIG. 1.

A first exemplary mode of embodiment of the present invention will be described using FIG. 1 to FIG. 3.

The brushless motor of this example is an outer rotor type brushless motor of the sensorless type, in which the commutation signal is obtained based on the counter electromotive force of the motor. This brushless motor is provided with a mounting plate 10, a bearing unit 20, a stator 30, and a rotor 40.

A so-called iron substrate, on the surface of which a printed circuit is formed, or a substrate in which a printed circuit board is overlaid on iron substrate or the like is used as the mounting plate 10, and a circular through opening is provided in the central portion thereof.

The bearing unit 20 has a bearing holder 21, a bearing 22, an oil-repellent member 23, a thrust plate 24, and a retaining member 25.

The bearing holder 21 holds the bearing 22 fixed in place at the interior thereof, and an integrally molded part made from a resin material having excellent oil resistance, heat resistance, dimensional stability and the like, a cut part made from a metal material, a drawn part or the like can be used for the bearing holder 21, but in this example a cut brass part is used. This bearing holder 21 is press fit into a through-hole provided in the mounting board 10, so as to be fixed in place by way of fitting therein.

The bearing 22 is a radial bearing that supports a rotary shaft 41 in free rotation, and is made from hollow cylindrical sintered metal impregnated with lubricating oil.

The oil-repellent member 23 is provided to prevent the lubricating oil in the bearing 22 from leaking to the outside of the bearing unit 20. This oil-repellent member 23 is a cylindrical member having a through hole at the center and made of metal, resin or the like, the surface of which has been subjected to oil repellent treatment, and is press-fitted into the top end of the opening in the bearing holder 21. The diameter of the through hole of the oil-repellent member 23 is slightly larger than the outer diameter of the rotary shaft 41, such that a slight gap is provided between the rotary shaft 41 and the oil-repellent member 23.

The thrust plate 24 is made of an abrasion resistant resin plate or the like and is disposed at the bottom of the bearing holder 21 so as to support the bottom end of the rotary shaft 41.

The retaining member 25 comprises a ring-shaped washer having suitable elasticity, and is arranged on a stepped portion 21a, which is formed inside the bearing holder 21.

The stator 30 has a stator core 31, a core cover 32 and a coil 33.

The stator core 31 has a circular opening at the center and is made of a laminate of plate-like cores that form a plurality of salient poles. The stator core 31 is fixed in place, disposed on a stepped portion 21b, which is formed at the outer circumference of the bearing holder 21. Each salient pole of the stator core 31 is covered with a core cover 32 made of an insulating resin, and the coil 33 is wound on each salient pole with this core cover 32 therebetween.

The rotor 40 comprises the rotary shaft 41, the rotor case 42, which rotates united with the rotary shaft 41, the drive magnet 43, the position detection magnet 44, and the separation plate 45.

The rotary shaft 41 has an elongate, substantially columnar shape, and the bottom end thereof is supported by the thrust plate 24. The rotary shaft 41 is supported is in free rotation by the bearing 22. An annular groove 41a is provided on the outer circumferential face of the rotary shaft 41 near the bottom end thereof, and the inner diameter portion of a retaining member 25 is inserted into the groove 41a. This makes it possible to limit the movement of the rotary shaft 41 in the upward direction in FIG. 1, so that the rotor 40 is prevented from coming out of the bearing unit 20.

The rotor case 42 is formed from a magnetic metal plate in the shape of a cap, and comprises a cylindrical portion, 42a formed in a cylindrical shape concentric with the rotary shaft 41, and a flat top portion 42b that covers the top of this cylindrical portion 42a. At the center of the top portion 42b, a burring part 42c is formed, oriented downward. The rotary shaft 41 is press-fitted into the burring part 42c so as to be fixed to the rotor case 42.

The cylindrical drive magnet 43 and the cylindrical position detection magnet 44 are fixed by bonding to inside the cylindrical portion 42a of the rotor case 42, along the axial direction.

The drive magnet 43 faces the salient poles of the stator core 31 in the radial direction, and in this example, six poles are alternately magnetized as N poles and S poles, in the circumferential direction, with a magnetic pole pitch of 30°. The magnetization configuration of the poles of the drive magnet 43 is a so-called sinusoidal wave magnetization, or trapezoidal wave magnetization, or a magnetization configuration similar to these, such that the magnetic flux density is higher in the circumferentially central portion of each pole than at the circumferential end portions of the pole. In FIG. 2, the boundary regions between the magnetic poles of the drive magnet 43 are indicated by dashed lines.

On the bottom end face of the drive magnet 43, rectangular recesses 43a with identical shapes are provided at a pitch of 120° in the circumferential direction. The centers, in the circumferential direction, of these three recesses 43a are located in the boundary regions between the N poles and the S poles of the drive magnet 43.

The brushless motor of the present example is driven by the rotational torque generated by the interaction between the rotating magnetic field generated by switching the energization of the coil 33 and the magnetic fields of the drive magnet 43.

The position detection magnet 44 is disposed axially below the drive magnet 43 and is connected to the drive magnet 43 by way of the separation plate 45.

In this example, the position detection magnet 44 is magnetized with one N pole and one S pole in the circumferential direction, such that the magnetic pole pitch is 180°. The magnetization configuration of the poles in the position detection magnet 44 is a so-called sinusoidal magnetization, or trapezoidal wave magnetization, or a magnetization configuration similar to these. Note that, in FIG. 2, the boundary regions between the magnetic poles of the position detection magnet 44 are indicated by dashed lines.

At the top end face of the position detection magnet 44, rectangular recesses 44a with identical shapes are provided at a pitch of 120° in the circumferential direction. The center, in the circumferential direction, of one of these three recesses 44a is located in the boundary region B2 between the magnetic poles in the position detection magnet 44.

A magnetic flux detector (not shown) is disposed on the mounting plate 10 facing the bottom end face of the position detection magnet 44 with a predetermined gap in the axial direction. In this example, a Hall IC with a Hall element and a signal conversion circuit is used for the magnetic flux detector. A Hall element is a magnetoelectric conversion element utilizing the Hall effect, which outputs an electric signal (voltage signal) proportional to the magnetic flux density of the magnetic field produced by the position detection magnet 44. The signal conversion circuit outputs an index signal having one pulse for each revolution of the rotor 40, on the basis of the output signal from the Hall element, allowing the rotational position (initial position or the like) of the rotor 40 to be detected.

Well-known methods can be used for the index signal output operations in the signal conversion circuit, such as a method wherein a voltage signal, for example from a Hall element, and a predetermined reference voltage are compared, and an index signal is output comprising pulses, based on the component that is higher than the reference voltage, or a method wherein an index signal is output comprising pulses when zero is crossed after the voltage signal from the Hall element exceeds the reference voltage.

The separation plate 45 is formed in an annular shape from a metal plate, and is disposed between the drive magnet 43 and the position detection magnet 44. Protrusions 45a with identical shapes are provided on the top face of the separation plate 45, at a pitch of 120° in the circumferential direction. These protrusions 45a have a shape corresponding to the recesses 43a in the drive magnet 43. Furthermore, protrusions 45b with identical shapes are provided on the bottom face of the separation plate 45 at a pitch of 120° in the circumferential direction, offset by 60° from the protrusions 45a. These protrusions 45b have a shape corresponding to the recesses 44a in the position detection magnet 44.

The protrusions 45a on the separation plate 45 are fitted into the recesses 43a in the drive magnet 43. Furthermore, the protrusions 45b on the separation plate 45 are fitted into the recesses 44a in the position detection magnet 44. Thereby, the drive magnet 43 and the position detection magnet 44 are positioned relative to each other in the circumferential direction. That is to say, the protrusions 45a, 45b on the separation plate 45 function as positioning parts that position the drive magnet 43 and the position detection magnet 44 in the circumferential direction.

Studies by the present inventors have shown that difference in the magnitude of the magnetic influence from the drive magnet 43 on the position detection magnet 44 depending on the material of the separation plate 45 is relatively small, but the thickness of the separation plate 45 in the axial direction is important. That is to say, it is important to spatially separate the position detection magnet 44 from the drive magnet 43. Accordingly, the separation plate 45 may be made of a magnetic material such as a metal or made of a non-magnetic material such as a resin, and the thickness in the axial direction should be established in accordance with the magnetization strength of the drive magnet 43 (strength of the magnetic field generated) and the ratio of the magnetization strength between the drive magnet 43 and the position detection magnet 44.

With the brushless motor of the present example, the annular separation plate 45 is disposed between the drive magnet 43 and the position detection magnet 44, such that the position detection magnet 44 is spatially separated from the drive magnet 43, whereby magnetic influence from the drive magnet 43 on the position detection magnet 44 can be effectively limited and thus a highly reliable position detection signal can be obtained. Furthermore, because the magnetization strength of the drive magnet 43 is higher at the circumferential centers than the circumferential ends of the magnetic poles, the magnitude of the magnetic influence of the drive magnet 43 on the position detection magnet 44 varies depending on the position in the circumferential direction, and because drive magnet 43 and the position detection magnet 44 can be positioned in the circumferential direction by way of the separation plate 45, variations in the magnitude of the magnetic influence, between individual motors, can be reduced.

Furthermore, in the brushless motor of this example, the boundary regions B1 and B2 between the magnetic poles in the position detection magnet 44 with two-pole magnetization are positioned so as to be at the same locations in the circumferential direction as the boundary regions A1 and A2 between the magnetic poles in the drive magnet 43, which have the lowest magnetization strength. Therefore, the magnetic influence from the drive magnet 43 is extremely low in the boundary regions B1 and B2 between the two magnetic poles in the position detection magnet 44.

In addition, in the brushless motor of this example, the protrusions 45a, 45b are formed as positioning parts on the separation plate 45, and recesses are formed in the drive magnet 43 and the position detection magnet 44. The drive magnet 43 has a recess 43a in the boundary region A1, which faces the boundary region B1 between the magnetic poles of the position detection magnet 44 in the axial direction; and the position detection magnet 44 has a recess 44a in the boundary region B2 between the poles thereof. Therefore, in the boundary regions B1 and B2 between the two magnetic poles of the position detection magnet 44, the axial distance from the drive magnet 43 is larger than the thickness of the separation plate 45, and thus the magnetic influence from the drive magnet 43 will be even lower.

Accordingly, a highly reliable position detection signal can be produced when using the method of outputting the index signal when the voltage signal of the Hall element crosses zero.

Furthermore, in the brushless motor of this example, the recesses 43a in the drive magnet 43, the recesses 44a in the position detection magnet 44, and the positioning parts (protrusions 45a, 45b) of the separation plate 45 are arranged at equal intervals in the circumferential direction, all of these being in a rotationally symmetrical configuration around the rotary shaft 41, such that an unbalanced center of gravity is not produced. It is thereby possible to prevent adverse influence on the rotational performance of the rotor 40 as a result of using the separation plate 45.

Furthermore, in the brushless motor of this example, a metal plate is used as the separation plate 45, and a plurality of protrusions 45a, 45b are formed by press working, with recesses being formed on the back side of these protrusions. Consequently, as shown in FIG. 3, a gap 46 is formed on the back side of the protrusions 45a, 45b. The gap 46 can be used as an adhesive reservoir for excess adhesive when bonding the drive magnet 43 and the position detection magnet 44 to the rotor case 42.

Second Exemplary Mode of Embodiment

Figure 4:
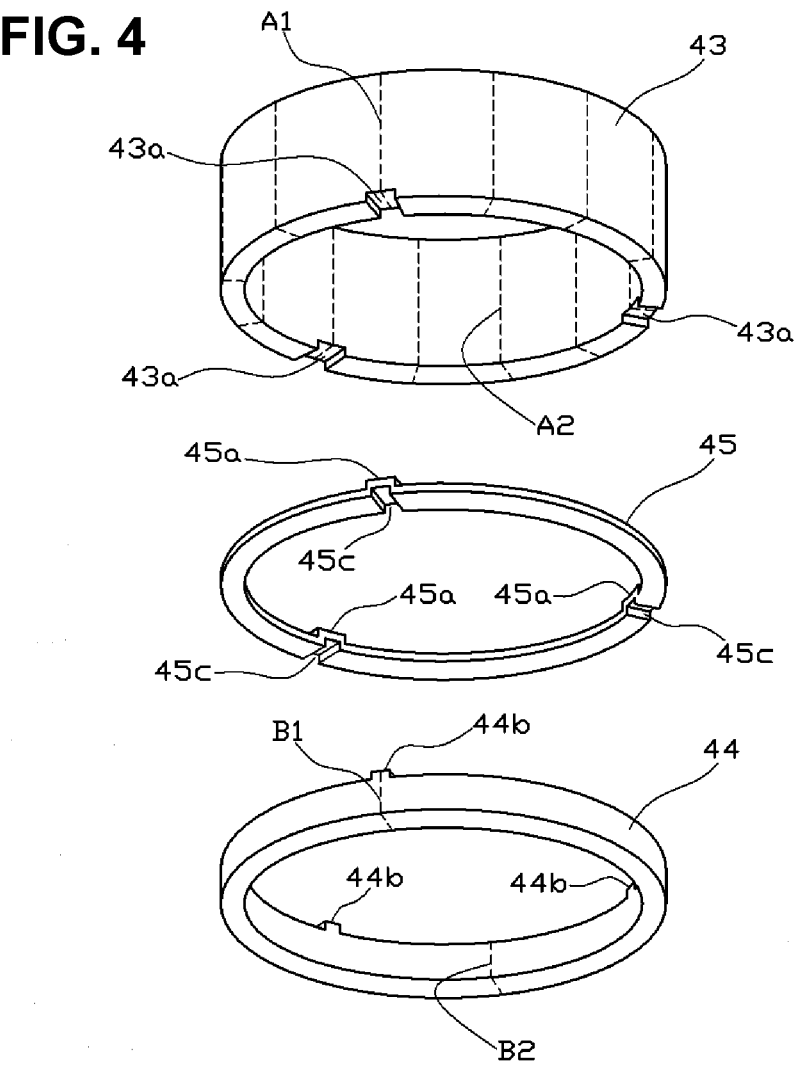
FIG. 4 is a perspective view of the drive magnet, the separation plate and the position detection magnet according to a second exemplary mode of embodiment of the present invention.
Figure 5:
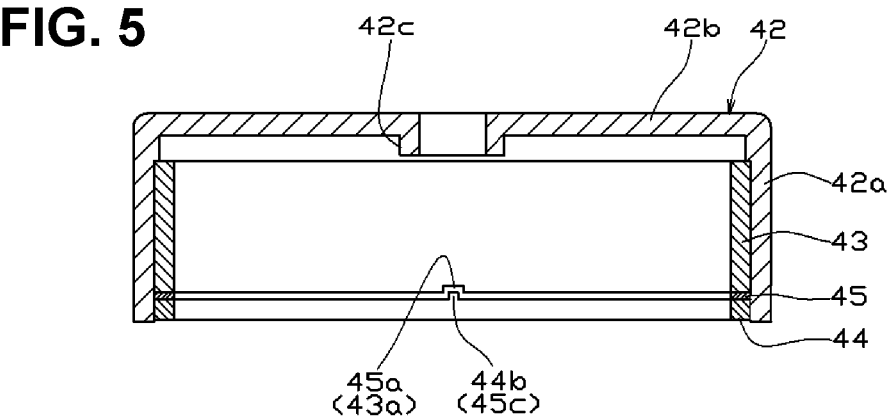
FIG. 5 is a sectional view showing a state in which the drive magnet, the separation plate and the position detection magnet in FIG. 4 are assembled in the rotor case.

A second exemplary mode of embodiment of the present invention will be described using FIG. 4 and FIG. 5. In this example, only the configurations of the position detection magnet 44 and the separation plate 45 are different from the first exemplary mode of embodiment.

On the top end face of the position detection magnet 44, rectangular protrusions 44*b* with identical shapes are provided at a pitch of 120° in the circumferential direction. The center, in the circumferential direction, of one of these three protrusions 44*b* is located in the boundary region B1 between the magnetic poles in the position detection magnet 44.

Protrusions 45*a* with identical shapes are provided on the top face of the separation plate 45, at a pitch of 120° in the circumferential direction. These protrusions 45*a* have a shape corresponding to the recesses 43*a* in the drive magnet 43. Furthermore, on the bottom of the separation plate 45, recesses 45*c* are formed on the back side of the protrusions 45*a*. These recesses 45*c* have a shape corresponding to the protrusions 44*b* of the position detection magnet 44.

The protrusions 45*a* on the separation plate 45 are fitted into the recesses 43*a* in the drive magnet 43. Further, the protrusions 44*b* on the position detection magnet 44 are fitted into the recesses 45*c* in the separation plate 45. Thereby, the drive magnet 43 and the position detection magnet 44 are positioned relative to each other in the circumferential direction.

In the brushless motor of this example as well, by disposing the separation plate 45 between the drive magnet 43 and the position detection magnet 44, and thus spatially separating the position detection magnet 44 from the drive magnet 43, the magnetic influence of the drive magnet 43 on the position detection magnet 44 can be limited, and thus a highly reliable position detection signal can be obtained. Furthermore, because the drive magnet 43 and the position detection magnet 44 are positioned in the circumferential direction by way of the separation plate 45, variations in the magnitude of the magnetic influence of the drive magnet 43 on the position detection magnet 44 can be reduced.

Furthermore, in the brushless motor of this example, the boundary regions B1 and B2 between the magnetic poles in the position detection magnet 44 with two-pole magnetization are positioned so as to be at the same locations in the circumferential direction as the boundary regions A1 and A2 of the magnetic poles in the drive magnet 43, which have the lowest magnetization strength. Therefore, the magnetic influence from the drive magnet 43 is extremely low at the boundary regions B1 and B2 between the two magnetic poles in the position detection magnet 44.

Furthermore, in the brushless motor of this example, the recesses 43*a* in the drive magnet 43, the protrusions 44*b* on the position detection magnet 44, and the positioning parts (protrusions 45*a*, 45*c*) of the separation plate 45 are arranged at equal intervals in the circumferential direction, all of these being in a rotationally symmetrical configuration around the rotary shaft 41, such that an unbalanced center of gravity is not produced. It is thereby possible to prevent adverse influence on the rotational performance of the rotor 40 as a result of using the separation plate 45.

The position detection magnet 44 has a lower thickness (height) than the drive magnet 43, usually being 1 millimeter to several millimeters or less, and therefore cracking is liable to occur during assembly. On the other hand, in the brushless motor of this example, by forming protrusions on the position detection magnet 44, rather than recesses, cracking of the position detection magnet 44 can be prevented.

Furthermore, in the brushless motor of this example, the drive magnet 43 and the position detection magnet 44 are tongue-and-groove fitted with the separation plate 45 at the same circumferential position, and the shape of the separation plate 45 is simplified such that undue flexure is less likely to occur, which facilitates assembly of the rotor.

Third Exemplary Mode of Embodiment

Figure 6:
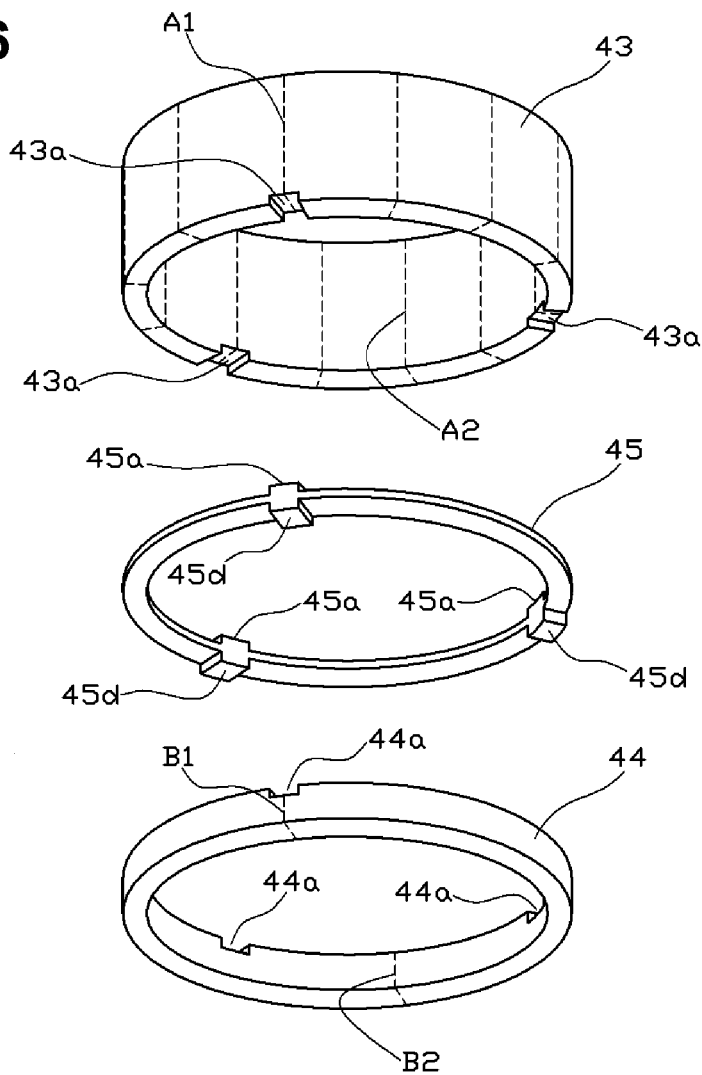
FIG. 6 is a perspective view of a drive magnet, the separation plate and the position detection magnet according to a third exemplary mode of embodiment of the present invention.
Figure 7:
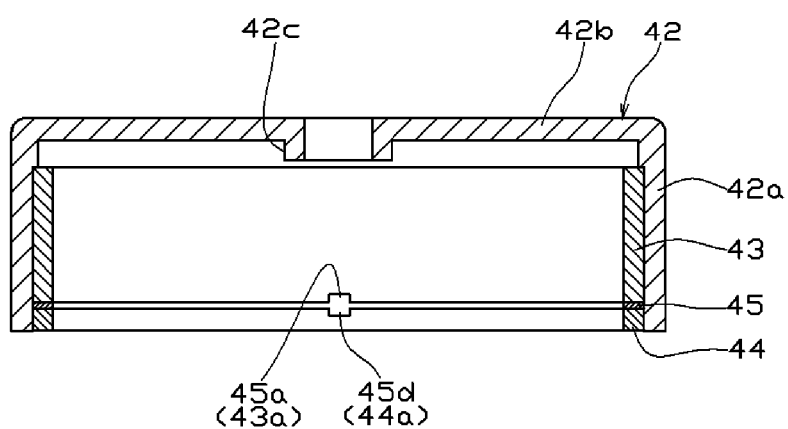
FIG. 7 is a sectional view showing the state in which the drive magnet, the separation plate and the position detection magnet in FIG. 6 are assembled in the rotor case.

A third exemplary mode of embodiment of the present invention will be described with reference to FIG. 6 and FIG. 7. In this example, only the configurations of the position detection magnet 44 and the separation plate 45 are different from the first exemplary mode of embodiment.

At the top end face of the position detection magnet 44, rectangular recesses 44*a* with identical shapes are provided at a pitch of 120° in the circumferential direction. The center, in the circumferential direction, of one of these three recesses 44*a* is located in the boundary region B1 between the magnetic poles of the position detection magnet 44.

The separation plate 45 of this example is made from an integrally molded heat-resistant resin part. Protrusions 45*a* with identical shapes are provided on the top face of the separation plate 45, at a pitch of 120° in the circumferential direction. These protrusions 45*a* have a shape corresponding to the recesses 43*a* in the drive magnet 43. Furthermore, on the bottom of the separation plate 45, protrusions 45*d* with identical shapes are formed on the back side of the protrusions 45*a*. These recesses 45*d* have a shape corresponding to the recesses 44*a* of the position detection magnet 44.

The protrusions 45*a* on the separation plate 45 are fitted into the recesses 43*a* in the drive magnet 43. Furthermore, the protrusions 45*d* on the separation plate 45 are fitted into the recesses 44*a* in the position detection magnet 44. Thereby, the drive magnet 43 and the position detection magnet 44 are positioned relative to each other in the circumferential direction.

In the brushless motor of this example as well, by spatially separating the position detection magnet 44 from the drive magnet 43, it is possible to limit the magnetic influence of the drive magnet 43 on the position detection magnet 44, and thus a highly reliable position detection signal can be obtained. Furthermore, because the drive magnet 43 and the position detection magnet 44 are positioned in the circumferential direction by way of the separation plate 45, variations in the magnitude of the magnetic influence of the drive magnet 43 on the position detection magnet 44 can be reduced.

Furthermore, in the brushless motor of this example, the boundary regions B1 and B2 between the magnetic poles in the position detection magnet 44 with two-pole magnetization are positioned so as to be at the same locations in the circumferential direction as the boundary regions A1 and A2 of the magnetic poles in the drive magnet 43, which have the lowest magnetization strength. Therefore, the magnetic influence from the drive magnet 43 is extremely low at the boundary regions B1 and B2 between the two magnetic poles in the position detection magnet 44.

Furthermore, in the brushless motor of this example, the recesses 43*a* in the drive magnet 43, the recesses 44*a* of in the position detection magnet 44, and the positioning parts (protrusions 45*a*, 45*d*) of the separation plate 45 are arranged at equal intervals in the circumferential direction, all of these being in a rotationally symmetrical configuration around the rotary shaft 41, such that an unbalanced center of gravity is not produced. It is thereby possible to prevent adverse influence on the rotational performance of the rotor 40 as a result of using the separation plate 45.

Furthermore, in the brushless motor of this example, the drive magnet 43 and the position detection magnet 44 are tongue-and-groove fitted with the separation plate 45 at the same circumferential position, which facilitates assembly of the rotor.

Furthermore, in the brushless motor of this example, because the separation plate 45 is formed of a resin having a lower specific gravity than metal, increases in the inertia of the rotor as a result using the separation plate 45 can be limited, allowing loss in control characteristics to be limited.

Exemplary modes of embodiment of the present invention have been described above, but the present invention is not limited to exemplary modes of embodiment described above, and can be suitably changed within the scope of the gist of the invention.

For example, in the exemplary modes of embodiment, the drive magnet has twelve poles and the position detection magnet has two poles, but the number of these magnetic poles can be freely determined.

Furthermore, in the exemplary modes of embodiment, recesses in the drive magnet and protrusions on the separation plate are fitted together, but it is also possible to form protrusions on the drive magnet and to form recesses in the separation plate.

Furthermore, the positioning parts on the separation plate are not limited to recesses and protrusions and, for example, may be through holes or cutaways, so long as it is possible to achieve positioning with the position detection magnet spatially separated from the drive magnet.

What is claimed is:

1. A brushless motor having an outer rotor wherein
the rotor has a rotary shaft, a rotor case fixed to the rotary shaft, and a cylindrical drive magnet and a cylindrical position detection magnet fixed to the inside of the rotor case, along the axial direction,
the drive magnet and the position detection magnet are alternately magnetized to N poles and S poles, in the circumferential direction,
an annular separation plate is disposed between the drive magnet and the position detection magnet, and
the separation plate has a positioning part for positioning the drive magnet and the position detection magnet in the circumferential direction.

2. The brushless motor according to claim 1 wherein
the drive magnet and the position detection magnet are positioned so that, in at least one location, boundary regions between N poles and S poles are at the same position in the circumferential direction.

3. The brushless motor according to claim 1 wherein
a plurality of the positioning parts are disposed at equal intervals in the circumferential direction.

4. The brushless motor according to claim 1 wherein
the positioning part is a recess or a protrusion, and
the drive magnet and the position detection magnet are tongue-and-groove fitted with the separation plate.

5. The brushless motor according to claim 4 wherein
the positioning parts are protrusions, and
the drive magnet and the position detection magnet have recesses that fit with the protrusions.

6. The brushless motor according to claim 4 wherein
the positioning part is a protrusion, and
the position detection magnet has a recess in at least one location at a boundary region between a N pole and a S pole, and is tongue-and-groove fitted with the separation plate at that recess.

7. The brushless motor according to claim 4 wherein
the positioning part is a protrusion, and
the drive magnet has a recess, in at least one location, in a portion axially facing a boundary region between a N pole and a S pole of the position detection magnet, and is tongue-and-groove fitted with the separation plate at that recess.

8. The brushless motor according to claim 4 wherein
the drive magnet and the position detection magnet are tongue-and-groove fitted with the separation plate at the same circumferential position.

9. The brushless motor according to claim 1 wherein
the separation plate is made from a resin molded body.

10. A brushless motor having an outer rotor wherein
the rotor has a rotary shaft, a rotor case fixed to the rotary shaft, and a cylindrical drive magnet and a cylindrical position detection magnet fixed to the inside of the rotor case, along the axial direction,
the drive magnet and the position detection magnet are alternately magnetized to N poles and S poles, in the circumferential direction,
an annular separation plate is disposed between the drive magnet and the position detection magnet,
the separation plate has a positioning part for positioning the drive magnet and the position detection magnet in the circumferential direction,
a plurality of the positioning parts are arranged at equal intervals in the circumferential direction, and
the drive magnet and the position detection magnet are positioned so that, in at least one location, boundary regions between N poles and S poles are at the same position in the circumferential direction.

11. The brushless motor according to claim 10 wherein
the positioning part is a recess or a protrusion, and
the drive magnet and the position detection magnet are tongue-and-groove fitted with the separation plate.

12. The brushless motor according to claim 11 wherein
the positioning parts are protrusions, and
the drive magnet and the position detection magnet have recesses that fit with the protrusions.

13. The brushless motor according to claim 11 wherein
the positioning part is a protrusion and
the position detection magnet has a recess in at least one location at a boundary region between a N pole and a S pole, and is tongue-and-groove fitted with the separation plate at that recess.

14. The brushless motor according to claim 11 wherein
the positioning part is a protrusion, and
the drive magnet has a recess, in at least one location, in a portion axially facing a boundary region between a N pole and a S pole of the position detection magnet, and is tongue-and-groove fitted with the separation plate at that recess.

15. The brushless motor according to claim 11 wherein
the drive magnet and the position detection magnet are tongue-and-groove fitted with the separation plate at the same circumferential position.

16. The brushless motor according to claim 10 wherein
the separation plate is made from a resin molded body.

* * * * *